United States Patent [19]

Tokumaru

[11] Patent Number: 4,839,840
[45] Date of Patent: Jun. 13, 1989

[54] HIGHLY RESPONSIVE BARREL SHIFTER

[75] Inventor: Takeji Tokumaru, Yokohama, Japan

[73] Assignee: Kabushiki Kaisha Toshiba, Kawasaki, Japan

[21] Appl. No.: 102,343

[22] Filed: Sep. 29, 1987

[30] Foreign Application Priority Data

Sep. 30, 1986 [JP] Japan .................................. 61-232357

[51] Int. Cl.⁴ .............................................. G06F 7/00
[52] U.S. Cl. ................................ 364/715.08; 364/900
[58] Field of Search ................... 364/715, 900, 715.08

[56] References Cited

U.S. PATENT DOCUMENTS

| | | | |
|---|---|---|---|
| 3,961,750 | 6/1976 | Dao | 364/900 |
| 4,345,316 | 8/1982 | Hirotani et al. | 364/900 |
| 4,383,304 | 5/1983 | Hirashima | 364/715 |
| 4,396,944 | 8/1983 | Kang et al. | 364/900 |
| 4,472,788 | 9/1984 | Yamazaki | 364/900 |
| 4,509,144 | 4/1985 | Palmer et al. | 364/900 |
| 4,583,197 | 4/1986 | Chappell et al. | 364/900 |
| 4,665,538 | 5/1987 | Machida | 364/715 X |
| 4,700,324 | 10/1987 | Doi et al. | 364/745 |

Primary Examiner—Gary V. Harkcom
Assistant Examiner—Tan V. Mai
Attorney, Agent, or Firm—Foley & Lardner, Schwartz, Jeffery, Schwaab, Mack, Blumenthal & Evans

[57] ABSTRACT

In a barrel shifter for shifting an input data by a given shift count in response to shift signals through series-connected NMOS transistors, it is impossible to obtain a sufficiently high ("1") or low ("0") level output signal at high response speed because of the presence of a threshold voltage of the NMOS transistor. To overcome this problem, the drain of the rearmost NMOS transistor (the output terminal of the shifter) is precharged to a supply voltage $V_{DD}$ in response to a precharge signal before an input data is shifted. Thereafter, if the input data changes to a "1" level, the rearmost NMOS transistor is turned off to output the precharged voltage $V_{DD}$ as the "1" level shifted output data. On the other hand, if the input data is at a "0" level, the rearmost NMOS transistor is turned on to output a ground voltage GND as the "0" level shifted output data.

7 Claims, 4 Drawing Sheets

HIGHLY RESPONSIVE BARREL SHIFTER

BACKGROUND OF THE INVENTION

1. Field of the Invention

The present invention relates generally to a barrel shifter, and more specifically a barrel shifter which shifts input data at high response speeds.

2. Description of the Prior Art

Where a barrel shifter is made up of a number of selectors composed of a plurality of N- or P-channel MOS transistors, since there inevitably exists a threshold voltage (on-voltage of the MOS transistor), it is impossible to obtain a sufficiently high ("1") level or low ("0") level shifted output data at the output terminal of the barrel shifter. In addition, since a drain voltage of the MOS transistor reaches a voltage level ($V_{DD} - V_{TH}$, where $V_{DD}$ denotes a supply voltage and $V_{TH}$ denotes a threshold voltage) in accordance with a time constant curve, there exists another problem in that a rise time or a fall time of the MOS transistor is relatively long, thus resulting in a low response speed or a low input data shifting speed.

To overcome the above-mentioned drawbacks, it is possible to configure the barrel shifter by means of CMOS transistors in which an NMOS transistor is connected in parallel with a PMOS transistor in complementary fashion. In this case, although a sufficiently high ("1") or low ("0") output signal can be obtained, there still exists the other problem such that the number of MOS transistors is doubled and therefore the barrel shifter becomes bulky in circuit configuration.

The arrangement and the operation of the prior art barrel shifter will be described hereinafter in greater detail with reference to the attached drawings under DETAILED DESCRIPTION OF THE PREFERRED EMBODIMENT.

SUMMARY OF THE INVENTION

With these problems in mind, therefore, it is the primary object of the present invention to provide a barrel shifter which can output sufficiently high or low voltage level shifted data at high response speeds without being subjected to the influence of the threshold voltage of MOS transistors and without complicating the circuit configuration or increasing the circuit volume.

To achieve the above-mentioned object, a barrel shifter for shifting an input data in response to shift signals by a given shift count through a plurality of series-connected semiconductor switching elements arranged between an input terminal and an output terminal thereof, according to the present invention comprises:

(a) means for precharging the output terminal to a supply voltage level before shifting an input data; and (b) means for turning off a rearmost semiconductor switching element when the input data is at a high level, in order to output the precharged supply voltage from the output terminal as a high level shifted output data and for turning on the same rearmost semiconductor switching element when the input data is at a low level, in order to output a ground voltage from the same output terminal as a low level shifted output data, irrespective of a threshold voltage of the semiconductor switching element.

In the barrel shifter according to the present invention, since a high ("1") level signal can be outputted as a precharged supply voltage and a low ("0") level signal can be outputted as a ground level, it is possible to obtain a sufficiently high or low voltage level shifted data from the output terminal at high response speed without increasing the barrel shifter dimensions.

BRIEF DESCRIPTION OF THE DRAWINGS

The features and advantages of the barrel shifter according to the present invention over the prior art barrel shifter will be more clearly appreciated from the following description of the preferred embodiment of the invention taken in conjunction with the accompanying drawings in which.

DETAILED DESCRIPTION OF THE PREFERRED EMBODIMENT

To facilitate an understanding of the present invention, a reference will be made to a prior art barrel shifter, with reference to the attached drawings.

Figure 1:
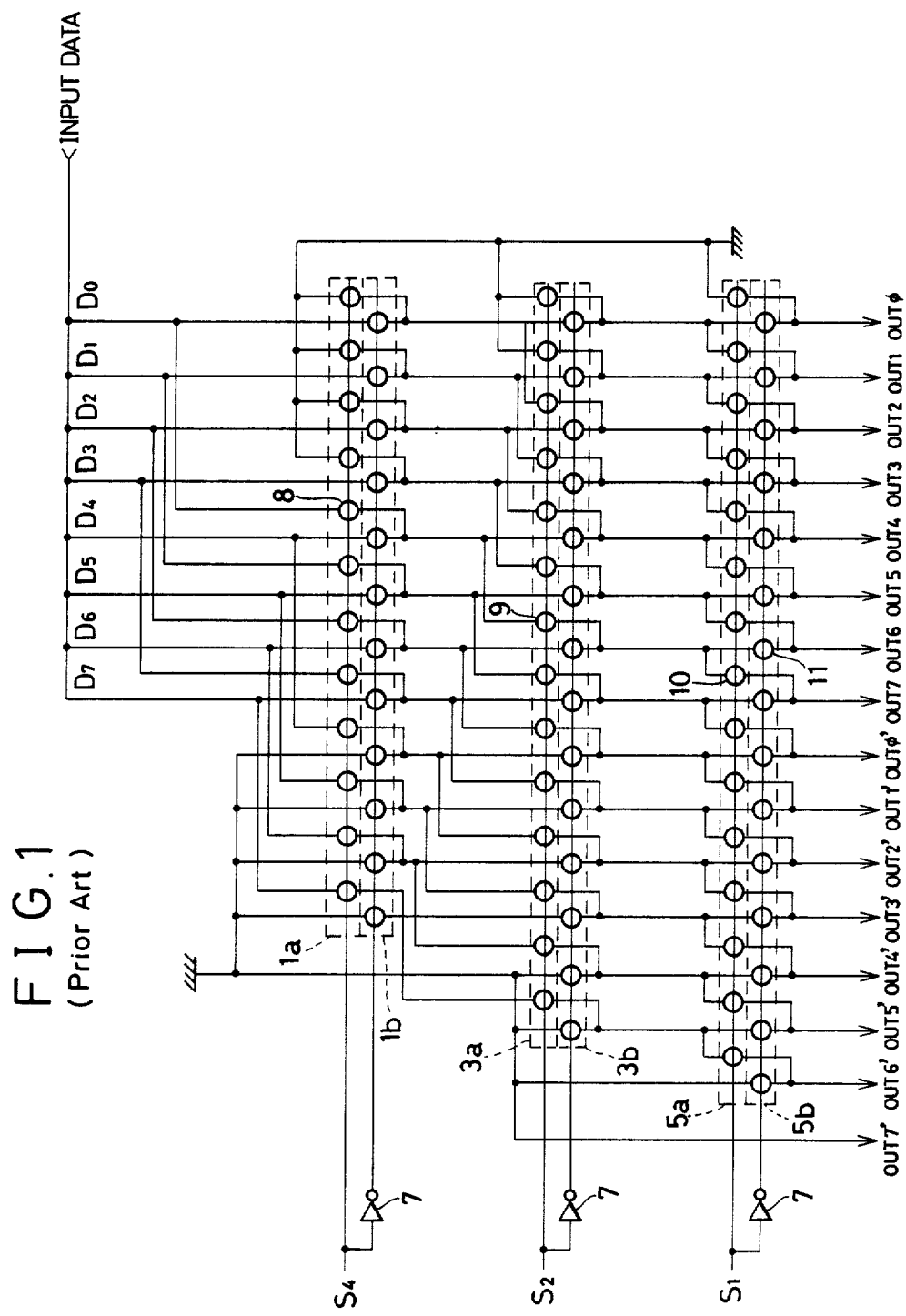
FIG. 1 is a schematic block diagram showing an exemplary prior-art barrel shifter, in which a number of selectors are arranged.

FIG. 1 shows a prior art barrel shifter which can shift an 8-bit input data $D_0$ to $D_7$ in the direction of higher significant bits in the leftward directional within a range of 0 to 7 bits. This barrel shifter shifts an input data $D_0$ to $D_7$ through six selectors $1a$, $1b$, $3a$, $3b$, $5a$ and $5b$ in response to three shift signals $S_4$ $S_2$ and $S_1$ each indicative of a quantity of shift (referred to as a shift count, hereinafter), respectively and outputs a shifted data from output terminals OUT0 to OUT7 and OUT 0' to OUT7'.

The selector $1a$ is set to a conductive status to shift the input data $D_0$ to $D_7$ by 4 bits in the leftward direction, when the shift signal $S_4$ indicative of a 4-bit shift count changes to a high voltage level. The selector $3a$ is set to a conductive status to shift the data inputted to the selector $3a$ by 2 bits in the leftward direction, when the shift signal $S_2$ indicative of a 2-bit shift count changes to a high voltage level. The selector $5a$ is set to a conductive status to shift the data inputted to the selector $5a$ by 1 bit in the leftward direction, when the shift signed S1 indicative of a 1-bit shift count changes to a high voltage level.

On the other hand, each of the selectors $1b$, $3b$ and $5b$ is set to a conductive status without shifting the input data D0 to D7, when each of the shift signals $S_4$, $S_2$ and $S_1$ changes to a low level and is applied to each of the selectors through each inverter 7.

As described above, the input data $D_0$ to $D_7$ is shifted by the selectors $1a$ to $5b$ according to a combination of the three shift signals $S_4$, $S_2$ and $S_1$ in the leftward direction within a range of 0 to 7 bits and then outputted from the output terminals OUT 0 to OUT 7, and OUT 0' to OUT 7'.

As well understood with reference to FIG. 1, 82 selector elements are incorporated in the barrel shifter in order to shift an 8-bit input data up to 7 bits in response to three shift signals $S_4$, $S_2$ and $S_1$. Therefore, in the barrel shifter of this type, if an input data is required to be shifted up to 31 bits, two additional shift signals, a shift signal $S_8$ indicative of an 8-bit shift count and a shift signal $S_{16}$ indicative of a 16-bit shift count, are necessary, and further the number of selector elements will be increased with increasing number of input data bits and increasing input data shift count.

Accordingly, in a barrel shifter for shifting a many-bit input data by a large shift count, since a great number of selector elements should be incorporated, it is indispensable to simplify the selectors and further to increase the transmission or response speed, in order to implement a high speed shifting operation in dependence upon a miniaturized barrel shifter configuration.

From the above-mentioned standpoint, conventionally, the selector is composed of a plurality of N-channel MOS transistors (referred to as NMOS) or a plurality of complementary MOS transistors (referred to as CMOS) each including an NMOS transistor and a P-channel MOS transistor (referred to as PMOS).

Figure 2:
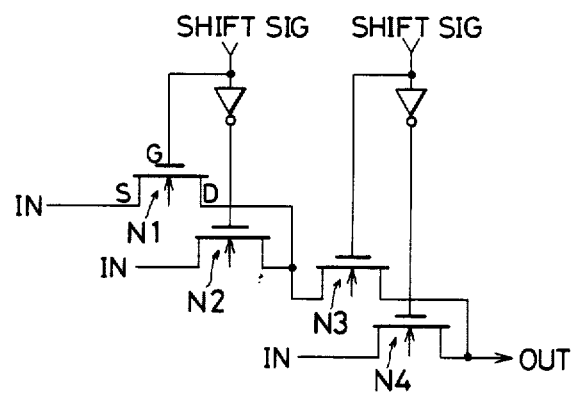
FIG. 2 is a circuit diagram showing a part of prior art selector element arrangements including NMOS transistors.

FIG. 2 shows an example of the selector made up of four NMOS transistors $N_1$ to $N_4$, in which each NMOS corresponds to one circle representative of a selector element shown in FIG. 1.

In an NMOS transistor, when a gate voltage $V_G$ exceeds an addition of source voltage $V_S$ and a threshold voltage $V_{TH}$ ($V_G \geq V_S = V_{TH}$), the NMOS transistor is turned on in such a way that a drain voltage $V_D$ rises up to only a voltage of ($V_S - V_{TH}$), because of the back gate effect of the NMOS transistor. Therefore, even if a high ("1") voltage level input data is set to a power supply voltage $V_{DD}$, the drain voltage $V_D$ cannot exceed a voltage of ($V_{DD} - V_{TH}$). In order to allow the drain voltage $V_D$ to approach the source voltage $V_S$, it is necessary to determine the threshold voltage $V_{TH}$ as low as possible. However, once $V_{TH}$ is reduced, the NMOS transistor is subjected to the influence of noise (because $V_S + V_{TH} \leq V_G$) and therefore is readily be turned on or off due to a change in gate voltage $V_G$ cause by noise. This reduces the allowable noise level and results in an erroneous operation. In summary, the threshold voltage $V_{TH}$ of the NMOS transistor should be determined under due consideration of the allowable noise level and the drain voltage $V_D$.

Figure 3:
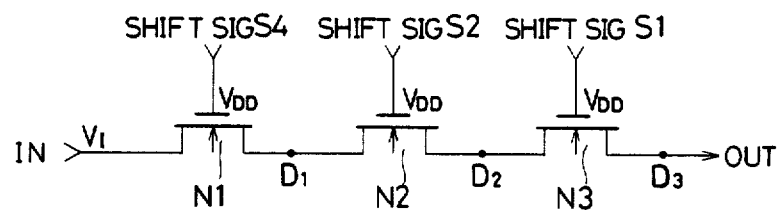
FIG. 3 is a circuit diagram showing a series-connected NMOS transistors for assistance in explaining the operation of the prior art selector elements.
Figure 4:
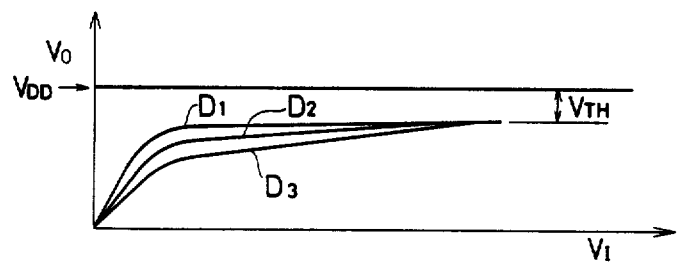
FIG. 4 is a graphical representation showing input-output characteristics of the prior-art series-connected selector elements shown in FIG. 3.

Further, where the selector is made up of a plurality of NMOS transistors, an input data is transmitted through a three series-connected NMOS transistors $N_1$ to $N_3$, for instance, to the output terminal OUT, as shown in FIG. 3. Here, when the voltage of shift signals $S_4$, $S_2$ and $S_1$ given to the gate terminals of three NMOS transistors $N_1$ to $N_3$ is designated as $V_{DD}$ and the voltage $V_I$ of the input information is increased gradually, the voltage $V_0$ at each drain $D_1$, $D_2$ or $D_3$ gradually rises at a very slow response speed as it approaches a voltage of ($V_{DD} - V_{TH}$) (where $V_{TH}$ denotes a threshold voltage of the transistor ), as shown in FIG. 4. In other words, the speed in voltage rise is reduced markedly near ($V_{DD} - V_{TH}$), in particular at the drain terminal $D_3$.

Therefore, when a threshold voltage at the succeeding stage for receiving a shifted data transmitted from the output terminal $D_3$ is determined near ($V_{DD} - V_{TH}$), the response speed from "0" to "1" level is very slow in relation to the succeeding stage. Therefore, in order to increase the response speed, the threshold voltage at the succeeding stage should be determined much lower than ($V_{DD} - V_{TH}$). However, if determined so, although the response speed is increased from "0" to "1" level, there exists another problem such that the response speed is conversely decreased markedly from "1" to "0" level.

Further, the same problem arises when the selector is made up of PMOS transistors. In the case of PMOS transistors, a "0" level voltage at the output terminal decreases down to only a threshold voltage of PMS transistor, and further the speed in voltage fall is lowered markedly where the voltage at the output terminal approaches the threshold voltage. To overcome this problem, since the threshold voltage at the succeeding stage is determined high, there exists the same problem such that the response speed from "0" to "1" level is reduced markedly.

Figure 5:
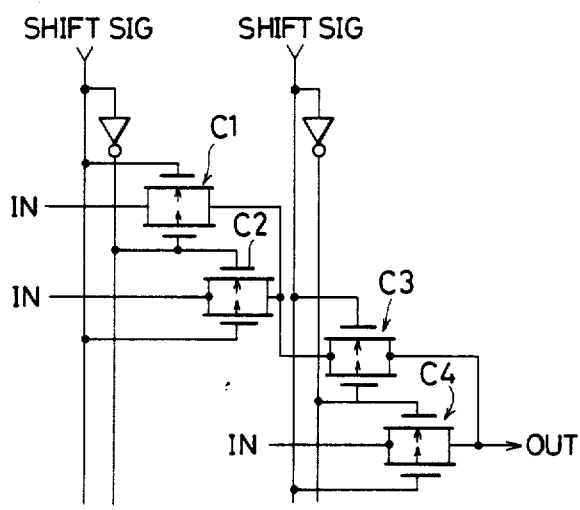
FIG. 5 is a circuit diagram showing a part of prior art selector elements including CMOS transistors.
Figure 6:
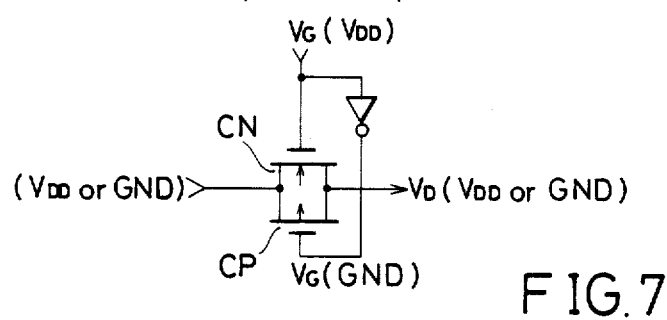
FIG. 6 is a circuit diagram showing one CMOS transistor of those shown in FIG. 5.

On the other hand, FIG. 5 shows an example of the selector made up of four CMOS transistors $C_1$ to $C_4$, in which one NMOS transistor and one PMOS transistor in combination correspond to one circle representative of one selector shown in FIG. 1. FIG. 6 shows a single CMOS transistor in which an NMOS transistor CN and a PMOS transistor CP are connected in parallel so as to form a complementary circuit. In FIG. 6, the gate voltage $V_G$ of the NMOS CN is determined as the power supply voltage $V_{DD}$; and that $V_G$ of the PMOS CP is determined as ground GND. Under there conditions, where the input voltage $V_{DD}$ is applied as the source voltage $V_S$, the output voltage $V_D$ is securely set to $V_{DD}$ as the drain voltage $V_D$ by means of the PMOS CP. Further, where the ground voltage GND is applied as source voltage $V_S$, the output voltage $V_D$ is securely set to GND as the drain voltage $V_D$ by means of the NMOS CN.

As described above, when the selector is made up of CMOS transistors, since the voltage is set to the power supply voltage or the ground voltage securely at the output terminal, it is possible to prevent the response speed from being lowered relative to the succeeding stage for receiving the shifted data outputted from the output terminal. However, there still exists a problem in this CMOS type selector such that the number of transistors is doubled as compared with that made up of NMOS or PMOS transistors.

In view of the above description, reference is now made to an embodiment of a part of the selectors incorporated in a barrel shifter according to the present invention.

Figure 7:
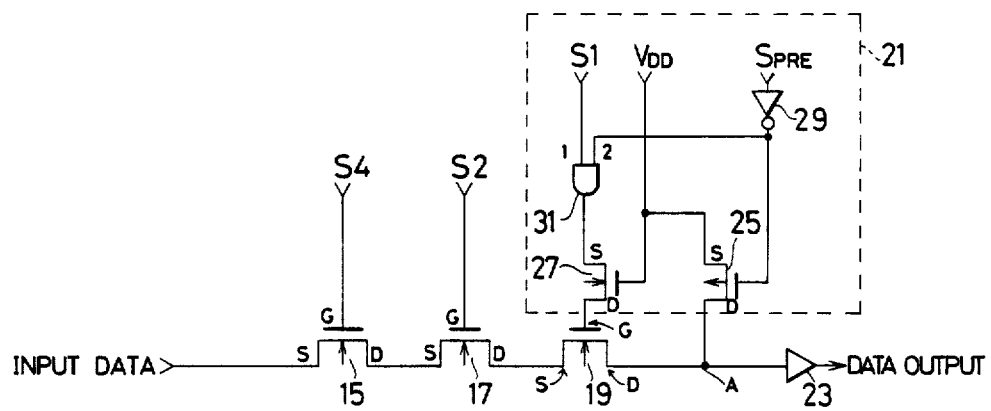
FIG. 7 is a circuit diagram showing a part of selector elements according to the present invention.

The selector shown in FIG. 7 comprises a selector section having three series-connected NMOS transistors 15, 17 and 19 and a precharge section 21. The selector shifts an input data through three NMOS 15, 17 and 19 transistors and transmits the shifted data through a data output terminal. In the selector according to the present invention, the precharge section 21 precharges a point A before a shifted input data is outputted through the data output terminal.

A shift signal $S_4$ is applied to the gate terminal G of the NMOS transistor 15, and input data is applied to the source terminal thereof, so that this NMOS transistor 15 is turned on when the shift signal $S_4$ changes to a high ("1") voltage level. A shift signal $S_2$ is applied to the gate terminal G of the NMOS transistor 17 and the drain terminal D of the NMOS transistor 15 is connected to the source terminal 3 of the NMOS transistor 17, so that this NMOS 17 is turned on when the shift signal $S_2$ changes to a high ("1") voltage level. The source terminal S of the NMOS transistor 19 is connected to the drain terminal D of the NMOS transistor 17, and the drain terminal D of the NMOS transistor 19 is connected to a data output terminal through a buffer amplifier 23.

The precharge section 21 is composed of a PMOS transistor 25, an NMOS transistor 27, an inverter 29 and an AND gate 31.

A precharge signal $S_{PRE}$ is applied to the gate terminal G of the PMOS transistor 25 through an inverter 29; a supply voltage $V_{DD}$ is given to the source terminal S of the PMOS 25; and the drain terminal D of the PMOS 25 is connected to the drain terminal D of the NMOS 19 or a point A, so that the PMOS 25 is turned on when the precharge signal $S_{PRE}$ changes to a high ("1") voltage level. Therefore, the supply voltage $V_{DD}$ is applied to the point A to precharge the point A at the same voltage $V_{DD}$.

The supply voltage $V_{DD}$ is also applied to the gate terminal G of the NMOS 27, and the drain terminal D of the NMOS 27 is connected to the gate terminal G of the NMOS 19.

A shift signal $S_1$ is applied to a first input terminal of the AND gate 31; the precharge signal $S_{PRE}$ is applied to a second input terminal thereof 31 via the inverter 29; and the output terminal of the AND gate 31 is connected to the source terminal of the NMOS 27. When the precharge signal $S_{PRE}$ changes to the "1" level and the shift signal $S_1$ is at the "0" level, the AND gate 31 outputs a "0" level output to the gate terminal G of the NMOS 19 via the NMOS 27, so that the NMOS 19 is kept turned off when the point A is being precharged.

With reference to the timing chart shown in FIG. 8, the operation of the selection according to the present invention will be described hereinbelow. In this selector, the output thereof (i.e. the drain of the NMOS 19) is precharged to a supply voltage $V_{DD}$ during a precharge interval $T_{PRE}$, and thereafter a shifted input data is outputted during a data output interval $T_{OUT}$; that is, the data shift interval is divided into two, precharge interval $T_{PRE}$ and shifted data output interval $T_{OUT}$, at each output terminal of the barrel shifter.

When a clock signal rises at the start of a precharge interval $T_{PRE}$, a precharge signal $S_{PRE}$ changes to a "1" level. This "1" level precharge signal $S_{PRE}$ is inverted through the inverter 29, so that the gate terminal G of the PMOS 25 is set to "0" level to turn on the PMOS 25. Further, since the second input terminal of the AND gate 31 is at the "0" level, the output of the AND gate 31 is at the "0" level, so that the source terminal S of the NMOS 27 is at "0" level to turn off the NMOS 19. Since the NMOS 19 is off and the PMOS 25 is on, a supply voltage $V_{DD}$ is applied to the drain D of the NMOS 19 (the point A) via the PMOS 25 to precharge the output of the selector.

Assumption is made that all the shift signals $S_1$, $S_2$ and $S_4$ are set to a "1" level ) during the precharge interval $T_{PRE}$ to facilitate understanding of the operation. Under these conditions ($S_1=S_2=S_4$="1"=$V_{DD}$), three selection elements 8, 9 and 10, for instance are activated as shown in FIG. 1. These three selectors 8, 9 and 10 shown in FIG. 1 can be composed of three NMOS transistors 15, 17 and 19 arranged as shown in FIG. 7. The gates of these three NMOS transistors 15, 17 and 19 are all set to the "1" level ($V_{DD}$) In this connection, if $S_1$=GND and $S_2=S_4=V_{DD}$, other three selector elements 8, 9 and 11, for instance are activated also as shown in FIG. 1. The gates of these three NMOS transistors are all set to $V_{DD}$. Therefore, a supply voltage $V_{DD}$ is applied to all the gates of selected NMOS transistors, and the "1" level ) or the "0" level (GND) determined according to an input data is applied to the source S of the NMOS 19 during the precharge interval $T_{PRE}$.

After the output of the selector (the drain D of the NMOS 19) has been precharged to the supply voltage $V_{DD}$ as described above, when the clock signal falls at the start of a shifted data output interval $T_{OUT}$, the precharge signal $S_{PRE}$ changes to the "0" level and therefore the gate of the PMOS 25 is set to the "1" level to turn off the PMOS 25, so that the precharge operation is completed at the output (D of 19) of the selector.

Further, when the precharge signal $S_{PRE}$ changes to the "0" level, since the second input terminal of the AND gate 31 connected to the inverter 29 changes to the "1" level, the output of the AND gate 31 is set to the "1" level, so that the NMOS 27 is turned on to apply the "1" level to the gate G of the NMOS 19. Here, since the "1" level is $V_{DD}$, the gate of the NMOS 19 rises to a voltage $V_G=(V_{DD}-V_{T1})$ as shown in FIG. 8(B), where $V_{T1}$ denotes a threshold voltage of the NMOS 27.

Figure 8:
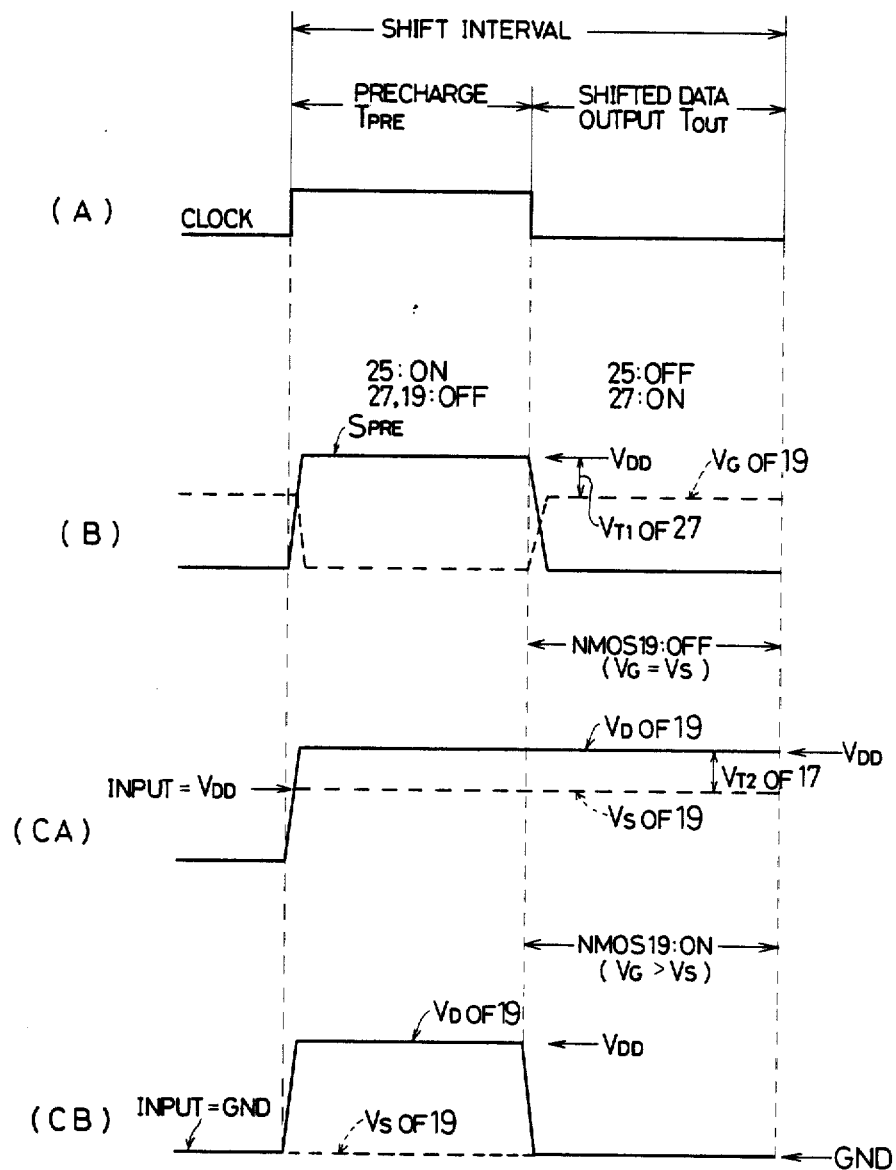
FIG. 8 is a timing chart for assistance in explaining the operation of the selector elements shown in FIG. 7 being divided into two, precharging and shifted data output, intervals.

Under these conditions, if the input data is at the "1" level ($V_{DD}$), since the gate terminals of the two NMOSs 15 and 17 are at $V_{DD}$ to turn on the two NMOSs 15 and 17, the source voltage of the NMOS 19 is set to a voltage $V_S=(V_{DD}-V_{T2})$ as shown in FIG. 8(CA), where $V_{T2}$ denotes a threshold voltage of the NMOS 15 or 17. Here, if the source voltage $V_S$ of the NMOS 19 is determined to the equal to the gate voltage $V_G$ thereof; that is, the threshold voltage $V_{T1}$ of the NMOS 27 is set so as to be roughly equal to that $V_{T2}$ of the NMOS 17 ($V_{T1}=V_{T2}$), the NMOS 19 is cut off, because the gate voltage ($V_G=V_{DD}-V_{T1}$) is equal to the source voltage ($V_S=V_{DD}=V_{T2}$). In other words, the output voltage of the selector (the drain D of the NMOS 19) is held at the supply voltage $V_{DD}$ even after the precharge operation. Therefore, the $V_{DD}$ level shifted input data can be outputted from the selector.

In summary, if $S_{PRE}$ is "1", PMOS 25 is ON; NMOS 27 is OFF; NMOS 19 is OFF (FOR PRECHARGE), if $S_{PRE}$ is "0", PMOS 25 is OFF; NMOS 27 is ON; NMOS 19 is ON. However, since $V_G$ is $V_S$ in NMOS 19, NMOS 19 is off, $V_{DD}$ is held at point A.

On the other hand, if the input data is at a "0" level (GND), since the shift signals $S_4$ and $S_2$ are at the supply voltage $V_{DD}$, the NMOSs 15 and 17 are both turned on, so that the source voltage of the NMOS 19 is set to the ground level. Here, since the gate voltage of the NMOS 19 is $V_G=(V_{DD}-V_{T1})$ as shown in FIG. 8(B), the NMOS 19 is turned on, so that the drain D of the NMOS 19 falls from $V_{DD}$ to GND as shown in FIG. 8 (CB). That is, the GND level shifted output data can be outputted from the selector, because the selector elements are NMOS transistors.

In summary, if an input data is "0", since $S_4$ and $S_2$ are both $V_{DD}$, NMOSs 15, 17 and 19 are all ON to drop $V_{DD}$ (precharge) to GND.

As described above, in the barrel shifter according to the present invention, since a "1" level input data can be outputted from the output terminal by outputting a precharged voltage $V_{DD}$ (supply voltage) and a "0" level input data can be outputted therefrom by outputting a ground voltage GND, it is possible to obtain a sufficiently high "1" level signal and a sufficiently low "0" level signal. Therefore, it is unnecessary to set the threshold level to a lower level at the succeeding stage.

Further, since the selectors are made up of NMOS, transistors, it is possible to reduce the number of elements as compared when the selectors are made up of CMOS transistors, thus permitting the miniaturization of an IC chip.

What is claimed is:

1. A barrel shifter for shifting an input data in response to each of shift signals, respectively, by a given shift count through a plurality of series-connected semiconductor switching elements arranged between an input terminal and an output terminal thereof, which comprises:
   (a) means for precharging the output terminal to a supply voltage level before shifting an input data; and
   (b) means for turning off a rearmost semiconductor switching element when the input data is at a high level, in order to output the precharged supply voltage through the output terminal as a high level shifted output data and for turning on the same rearmost semiconductor switching element when the input data is at a low level, in order to output a ground voltage from the same output terminal as a low level shifted output data, irrespective of a threshold voltage of the semiconductor switching element.

2. The barrel shifter as set forth in claim 1, wherein said output terminal precharging means comprises a semiconductor element for applying a supply voltage to the output terminal when turned on in response to a precharge signal.

3. The barrel shifter as set forth in claim 1, wherein said rearmost switching element turning-on or -off means comprises:
   (a) an AND gate for providing an AND product of a shift signal and an inverted precharge signal and outputting an ANDed signal when the precharge signal is absent; and
   (b) a semiconductor element connected to the rearmost switching element for turning off the rearmost switching element in response to the ANDed signal when the input data is at a high level, to output the precharged supply voltage as a high level shifted output data and for turning on the rearmost switching element in response to the ANDed signal when the input data is at a low level, to output a ground level voltage as a low level shifted output data.

4. A barrel shifter for shifting an input data in response to each of shift signals, respectively by a given shift count through a plurality of MOS transistors connected in series between an input terminal and an output terminal thereof, which comprises;
   (a) means for precharging a drain terminal of a rearmost MOS transistor to a supply voltage level before shifting operation; and
   (b) means for applying a voltage, substantially equal to that given to a source terminal of the rearmost MOS transistor when the input data is at a high level, to a gate terminal of the rearmost MOS transistor, in order to turn off the rearmost MOS transistor and thereby to output the precharged supply voltage from the output terminal as a high level shifted output data,
   the rearmost MOS transistor being turned on when the input data is at a low level to output a ground voltage level from the output terminal as a low level shifted output data.

5. The barrel shifter as set forth in claim 4, wherein said drain terminal precharging means is a PMOS transistor turned on in response to a precharge signal to apply the supply voltage to the drain of the rearmost MOS transistor.

6. The barrel shifter as set forth in claim 4, wherein said voltage applying means comprises:
   (a) an AND gate for providing an AND product of a shift signal and an inversed precharge signal and outputting an ANDed signal when the precharge signal is absent; and
   (b) an NMOS transistor turned on in response to the ANDed signal to apply the supply voltage to the gate terminal of the rearmost MOS transistor.

7. A barrel shifter for shifting an input data in response to each of shift signals, respectively by a given shift count through a plurality of NMOS transistors connected in series between an input terminal and an output terminal thereof, which comprises:
   (a) a first MOS transistor having a gate terminal responsive to a precharge signal, a source terminal connected to a supply voltage, and a drain terminal connected to a drain terminal of a rearmost series-connected MOS transistor, to apply the supply voltage to the drain of the rearmost MOS transistor in response to the precharge signal;
   (b) an AND gate having a first input terminal connected to an inversed precharge signal and a second input terminal connected to a shift signal, to output an ANDed signal; and
   (c) a second MOS transistor having a gate terminal connected to the supply voltage, a source terminal connected to an output terminal of said AND gate, and a drain terminal connected to a gate of the rearmost MOS transistor, to turn off the rearmost MOS transistor by applying a voltage, substantially equal to that given to a source terminal of the rearmost MOS transistor when the input data is at a high level, in order to output the precharged supply voltage from the drain terminal of the rearmost MOS transistor as a high level shifted output data, said second MOS transistor being turned on in response to the ANDed signal when the input data is set at a low level, to output a ground level voltage from the source output terminal as a low level shifted output data.

* * * * *